United States Patent [19]
Floyd et al.

[11] Patent Number: 5,739,260
[45] Date of Patent: Apr. 14, 1998

[54] HYDROPHOBICALLY MODIFIED RESIN COMPOSITION FOR GRAPHICS APPLICATIONS

[75] Inventors: William C. Floyd, Chester; Larry G. Venable, York; William A. Fuchs, Jr., Chester, all of S.C.

[73] Assignee: Sequa Chemicals, Inc., Chester, S.C.

[21] Appl. No.: 693,891

[22] Filed: Aug. 5, 1996

[51] Int. Cl.$^6$ .................................................. C08G 12/30
[52] U.S. Cl. .......................... 528/254; 528/243; 528/245; 528/266; 427/372.2; 427/385.5; 428/278; 428/290
[58] Field of Search ...................... 528/243, 254, 528/245, 266; 427/372.2, 385.5; 428/278, 290

[56] References Cited

U.S. PATENT DOCUMENTS

| | | | |
|---|---|---|---|
| 3,420,799 | 1/1969 | Cavitt | 260/67.6 |
| 4,835,320 | 5/1989 | Blanc et al. | 568/465 |
| 4,851,577 | 7/1989 | Chastrette et al. | 564/28 |
| 4,854,934 | 8/1989 | Wilhelm et al. | 8/185 |
| 4,968,774 | 11/1990 | Didier et al. | 528/245 |
| 5,326,378 | 7/1994 | Wilhelm et al. | 8/182 |
| 5,539,077 | 7/1996 | Floyd | 528/245 |

FOREIGN PATENT DOCUMENTS 9410186  4/1994  France .

*Primary Examiner*—Duc Truong
*Attorney, Agent, or Firm*—Mitchell D. Bittman

[57] ABSTRACT

A resin composition useful as a crosslinker for graphics applications is provided comprising the reaction product of an amine derivative chosen from melamine, glycolurile or their mixtures with a $C_1$ to $C_8$ dialkoxyethanal, the reaction product is then mixed, preferably reacted with a polyol and a hydrophobic modifier.

31 Claims, No Drawings

HYDROPHOBICALLY MODIFIED RESIN COMPOSITION FOR GRAPHICS APPLICATIONS

BACKGROUND OF THE INVENTION

A non-formaldehyde alternative to phenol and melamine resins, which are based on formaldehyde, has been desired because of regulatory and health concerns regarding formaldehyde. Due to the high performance, strength and rigidity of these thermosetting formaldehyde-based resins in industrial applications, replacement products maintaining suitable performance have been difficult to find. This invention discloses a resin composition which performs in many applications like phenol-formaldehyde and melamine-formaldehyde resins, but contain no phenol or formaldehyde. These are thermosetting, film-forming compositions which offer tensile strength, rigidity and water-resistance comparable to the phenol-formaldehyde and melamine-formaldehyde resins now in use.

In the graphics field melamine formaldehyde resins are used in catalytic overprint varnishes and other graphics applications as a crosslinker to provide a coating having water resistance, such as a top coat over printed surfaces. However, these resins contain formaldehyde which is an irritant.

French Patent Application number 94-10186 filed Aug. 22, 1994 by Societe Francaise Hoechst discloses a novel aminoplast resin comprising the reaction product of an amine derivative such as melamine, glycolurile or their mixtures with an aldehyde of the formula R—CHO in which R represents a dialkoxy methyl group, 1,3-dioxolan2-yl possibly substituted up to 4 and/or 5 times by one or more alkyl groups (preferably up to $C_4$ alkyl), or a 1,3-dioxan-2-yl group possibly substituted up to 4, 5 and/or 6 times by one or more alkyl groups (preferably up to $C_4$ alkyl); in mixtures possibly with glyoxal. However, these aminoplast resins do not self-condense satisfactorily, forming films which are weak, brittle and water-sensitive. Attempts to hydrolyze the acetal groups of these resins in order to increase their reactivity resulted in degradation of the melamine ring.

Thus it is an object of this invention to improve the aminoplast resins as disclosed by French Patent Application No. 94-10186 to provide a resin which upon crosslinking provide films which are strong, hard, tough and water resistant.

It is a further object of this invention to provide a resin as a suitable replacement for urea-formaldehyde and melamine-formaldehyde resins in catalytic overprint varnishes and other graphics applications that contain no formaldehyde and provide good water resistance.

SUMMARY OF THE INVENTION

Briefly, the objects of this invention are provided by a resin composition comprising the reaction product of an amine derivative chosen from the group consisting of melamine, glycolurile or their mixtures with a $C_1$ to $C_8$ dialkoxyethanal (which may also be referred to as a dialkoxyacetaldehyde or a glyoxal monoacetal), the reaction product is then mixed or reacted with a polyol having 2 or more hydroxyl groups and a hydrophobic modifier. Optionally the amine derivative and dialkoxyethanal can also be reacted with a dialdehyde, preferably glyoxal. In a preferred embodiment the polyol and hydrophobic modifier are reacted with the reaction product.

DETAILED DESCRIPTION

The resin composition comprises a reaction product mixed with a polyol and a hydrophobic modifier. The reaction product is the addition product of an amine derivative with dialkoxyethanal. The amine derivative is either melamine, glycolurile or a mixture thereof, with melamine preferred because the products provide stronger and tougher films.

The $C_1$–$C_8$ dialkoxyethanal is reacted with the amine derivative generally at a molar ratio of 1 to 6 equivalents of dialkoxyethanal to melamine and 1 to 4 equivalents for glycolurile, preferably 2 to 4 equivalents of dialkoxyethanal to the amine derivative. In addition a dialdehyde, preferably glyoxal, can also be included in the reaction product in order to provide branching points in the molecular structure, increase reactivity, and to promote a higher molecular weight. The dialdehyde is added generally at a level of 0.05 to 3 preferably 0.5 to 1, molar equivalents of aldehyde to the amine derivative.

The $C_1$ to $C_8$ dialkoxyethanal generally has the following formula:

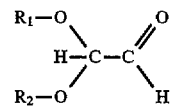

wherein $R_1$ and $R_2$ are $C_1$–$C_8$ alkyl or $R_1$ and $R_2$ are joined to form a cyclic dioxolano or a dioxano substituent. The $C_1$ to $C_8$ dialkoxyethanal can also be described as a glyoxal monoacetal in which the acetal is comprised of linear substituents or is a cyclic acetal. Preferably $R_1$ and $R_2$ are a $C_1$–$C_4$ alkyl group, preferably the same group and most preferably a methyl group as this is the most economical derivative which is commercially available, manufactured by Societe Francaise Hoechst and sold under the trademark Highlink DM (TM).

In addition to the reaction product a polyol having 2 or more hydroxyl groups is mixed in to form the resin composition. Suitable polyols include dialkylene glycol, polyalkylene glycol, glycerin, alkoxylated glycerin, polyvinyl alcohol, dextrose (and dextrose oligomers and derivatives), starch, starch derivatives, polyglycidol or polysaccharrides (and derivatives). Preferred polyols are dipropylene glycol, triethoxylated glycerin, enzyme-converted starches, polyvinyl alcohol and mixtures thereof. The polyol is added at a level of at least 0.05 molar equivalents of polyol to the reaction product, preferably at least 0.1 molar equivalents. Generally the resin composition comprises an amount of about 1% to 99%, with 15–50% preferred of polyol by weight (dry basis) of the resin composition. Through the addition of a polyol to the reaction product a resin is provided which upon crosslinking provides films which are strong, hard, tough and water resistant.

In a preferred embodiment the polyol is reacted with the reaction product. The resultant resin composition has been shown to have significantly improved properties, namely improvement in ambient tensile and hot wet tensile for a textile product using the resin composition as a binder where the polyol is reacted with the reaction product verses being mixed with the reaction product. Generally the polyol is reacted with the reaction product under the following conditions: 75° to 110° C., or at reflux; at a pH of 4–7, preferably 5.5 to 6.5; and for a time period of 0.5 to 5 hours, preferably 2–3 hours.

The hydrophobic modifier has a non-polar portion and combines with the resin to provide suitable water resistance to the resin, i.e improved resistance of the cured film to softening or dissolution by water. The modifier preferably condenses with a reactive hydroxyalkylene group on the resin providing a hydrophobic group on one end of the resin molecule, which shields the resin from water penetration. This provides the resin with water resistance while still retaining film integrity and strength. The hydrophobic modifier is preferably a hydroxy, amino or amido-functional compound containing a $C_6$–$C_{20}$ alkyl or aryl group. Suitable hydrophobic modifiers include ethoxylated glycerol monostearate, benzoguanamine, tetraethylene tetramine decanamide and the like to provide suitable water resistance to the resin. Generally about 0.1 to 20%, preferably 2 to 10%, of the modifier based on the weight (dry basis) of the resin composition is added.

The addition of an acid catalyst to the resin composition is also desirable. Suitable catalysts are sulfuric acid, hydrochloric acid, phosphoric acid, p-toluene sulfonic acid, methane sulfonic acid, Lewis acids such as aluminum salts, magnesium chloride, zirconium lactate, zirconium citrate, zirconium acetate, zirconium sulfate and zinc chloride and the like. These catalysts facilitate the reaction(s) which effects the crosslinking. The acid catalyst is generally added in an amount of 0.1% to 15%, preferably 1% to 10% based on the weight (dry basis) of the reaction product.

The resin composition obtained herein contains neither phenol nor formaldehyde but has been found to maintain the strength and integrity of phenolic resins under conditions of severe usage including high temperature and water immersion. The resin composition can be added to a hydroxyl containing polymer (e.g. polyvinyl alcohol or a styrene-allyl alcohol copolymer) wherein the resin composition is used to crosslink the polymer.

The resin composition is advantageously used in graphics applications as a crosslinker for hydroxy functional polymers, e.g. catalytic overprint varnish formulations, to provide a clear top coat over printed surfaces, including wood, metal (e.g. aluminum foil), polyester, polyethylene, paper, polypropylene and foil.

EXAMPLE I

To a 1 liter flask equipped with a stirrer, condenser, thermometer, and pH probe, was charged 477 grams (2.75 moles) of 60% Dimethoxyethanal (DME) solution and 126 grams (1 mole) of melamine. The pH was raised from 5.8 to 9.5 with 5% sodium hydroxide solution and the slurry was heated to 60° C., whereupon it became clear. The pH was maintained in this range by slow addition of 37 grams of 5% NaOH by a syringe pump over two hours. At this time, 4 grams of tetraethylene tetramine decanamide, 20 grams of glycerin triethoxylate and 40 grams of dipropylene glycol were added. The pH was adjusted to 6.5 with 0.6 grams of 40% sulfuric acid and refluxed at 103° C. for three hours. The product was cooled to afford a clear, viscous, dark amber solution of 66% dry-down solids.

EXAMPLE II

The procedure of Example 1 was repeated, except that 5 grams of 5-ethoxylated glycerol monostearate (GMS-5 by Ethox Chemicals, Inc.) was used in lieu of the tetraethylene tetramine decanamide. The resulting product was a viscous, hazy medium amber solution of 64% dry-down solids.

EXAMPLE III

The formulation of Example I was used, except that the DME and melamine were combined and refluxed at pH of 6.5. While still at reflux, the tetraethylene tetramine decanamid and dipropylene glycol were added and refluxed two additional hours. Results were similar.

EXAMPLE IV

To demonstrate the utility of these compositions in catalytic overprint varnishes, the following formulations were prepared:

A. Urea-formaldehyde catalytic overprint varnish

| | |
|---|---|
| polyol functional alkali soluble resin (45%) | 25.42% |
| Urea-formaldehyde resin (Georgia Pacific #2928) | 12.71 |
| water | 11.86 |
| ammonium hydroxide 20% | 1.70 |
| HS5400 (siloxane-polyether copolymer, by Midwest Graphics) | 0.85 |
| TR7830 (styrene acrylic emulsion, by Sequa Chemicals, Inc.) | 22.88 |
| HG7527 (styrene acrylic emulsion, by Sequa Chemicals, Inc.) | 24.58 |
| n-propyl alcohol | 0.50 |
| Surfynol 104 (surfactant, by Air Products Corp.) | 0.50 |

B. Melamine-formaldehyde catalytic overprint varnish

| | |
|---|---|
| polyol funcfional alkali soluble resin (45%) | 25.42% |
| Permafresh MEL 80 (melamine-formaldehyde resin, by Sequa Chemicals, Inc.) | 12.71 |
| water | 11.86 |
| ammonium hydroxide, 20% | 1.70 |
| HS5400 | 0.85 |
| TR7830 | 22.88 |
| HG7527 | 24.58 |
| n-propyl alcohol | 0.50 |
| Surfynol 104 | 0.50 |

C. Melamine/DME catalytic overprint varnish I

| | |
|---|---|
| polyol functional alkali soluble resin | 25.45% |
| resin of Example 2 | 12.71 |
| water | 11.86 |
| ammonium hydroxide, 20% | 1.70 |
| HS5400 | 0.85 |
| TR7830 | 22.88 |
| HG7527 | 24.58 |
| n-propyl alcohol | 0.50 |
| Surfynol 104 | 0.50 |

D. Melamine/DME catalytic overprint varnish II

| | |
|---|---|
| polyol functional alkali soluble resin | 25.42% |
| resin of Example I | 12.71 |
| water | 11.86 |
| ammonium hydroxide, 20% | 1.70 |
| HS5400 | 0.85 |
| TR7830 | 22.88 |
| HG7527 | 24.58 |
| n-propyl alcohol | 0.50 |
| Surfynol 104 | 0.50 |

Catalysts:

| | |
|---|---|
| Catalyst 1 | |
| water | 50% |
| p-toluenesulfonic acid | 40 |
| triethanol amine | 10 |
| Catalyst 2 | |
| water | 40% |
| p-toluenesulfonic acid | 40 |
| triethanolamine | 20 |

Formulations were prepared using 95% overprint varnish (OPV) system, and 3% catalyst system diluted with 2% water. Diluted catalyst systems were added slowly. Use of Catalyst 2 gave results equivalent to those obtained with Catalyst 1. The n-propyl alcohol and Surfynol 104 were added to aid in defoaming the OPV mixes and wetting the substrate. Formulations were applied to foil or black and white coated board substrates using a flexo hand proofer. Coated substrates were cured for 30 seconds in a 250° F. forced air oven. They were tested for 60° angle gloss. All formulations had good to excellent stability. The mix containing the Urea formaldehyde resin had some coagulum after a week. The other formulations were stable.

Results:

| Substrate | 60° Angle Gloss | | |
|---|---|---|---|
| Formula: | White | Black | Foil |
| A | 94.75 | 95.55 | 99.70 |
| B | 94.55 | 94.80 | 97.85 |
| C | 95.60 | 97.50 | 110.90 |
| D | 96.95 | 96.05 | 99.85 |

Gloss numbers given are the average of two samples. These results show that samples C and D with the resins of Examples 1 and 2 respectively provide equal or better performance when used in a catalytic overprint varnish as compared to urea-formaldehyde or melamine formaldehyde resins. Solvent, moisture and humidity resistance were also comparable. These resins offer all of the performance of melamine formaldehyde or urea-formaldehyde, but do not contain or emit formaldehyde. This makes these resins less of a irritant or health hazard in the workplace.

What is claimed is:

1. A resin composition comprising:
   the reaction product of an amine derivative selected from the group consisting of melamine, glycolurile and their mixtures with a $C_1$ to $C_8$ dialkoxyethanal;
   a polyol having 2 or more hydroxyl groups; and
   a hydrophobic modifier having a non-polar portion which combines with the resin to provide water resistance to the resin, wherein the hydrophobic modifier is an amido, hydroxy or amino functional compound containing a $C_6$-$C_{20}$ alkyl or aryl group.

2. Resin composition of claim 1 wherein the polyol is reacted with said reaction product.

3. Resin composition of claim 2 wherein the reaction product comprises a molar ratio of 1 to 6 molar equivalents of dialkoxyethanal to the melamine and 1 to 4 equivalents of dialkoxyethanal to the glycolurile and comprises at least 0.05 molar equivalents of polyol to the reaction product.

4. Resin composition of claim 3 wherein the reaction product comprises a molar ratio of 2 to 4 molar equivalents of dialkoxyethanal to the amine derivative and comprises at least 0.1 molar equivalents of polyol to the reaction product.

5. Resin composition of claim 1 wherein the reaction product is of the amine derivative, the dialkoxyethanal and further comprises a dialdehyde.

6. Resin composition of claim 5 wherein the dialdehyde is glyoxal.

7. Resin composition of claim 6 wherein the reaction product comprises 0.05 to 3 molar equivalents of glyoxal to the amine derivative.

8. Resin composition of claim 7 wherein the reaction product comprises 0.5 to 1 molar equivalents of glyoxal to the amine derivative.

9. Resin composition of claim 2 wherein the polyol is selected from the group consisting of dialkylene glycol, polyalkalene glycol, glycerine, alkoxylated glycerin, polyvinyl alcohol, dextrose, dextrose oligomers, polysaccharide, polysaccharide derivatives, starch, starch derivatives, polyglycidol and their mixtures.

10. Resin composition of claim 9 comprising 1 to 99% by weight of polyol by weight of the resin composition and 0.1 to 20% by weight of hydrophobic modifier by weight of the resin composition.

11. Resin composition of claim 10 wherein the polyol as selected from the group consisting of dipropylene glycol, triethoxylated glycerin, enzyme-converted starch, polyvinyl alcohol and mixtures thereof.

12. Resin composition of claim 9 comprising 15 to 50% by weight of polyol by weight of the resin composition and 2 to 10% by weight of hydrophobic modifier by weight of the resins composition.

13. Resin composition of claim 2 wherein the hydrophobic modifier is reacted with the reaction product.

14. Resin composition of claim 13 wherein the hydrophobic modifier is selected from the group consisting of ethoxylated glycerol monostearate, benzoguanamine and tetraethylene tetramine decanamide.

15. Resin composition of claim 2 further comprising an acid catalyst.

16. Resin composition of claim 13 comprising 0.1% to 15% of acid catalyst by weight of the reaction product.

17. Resin composition of claim 13 wherein the acid catalyst is chosen from the group consisting of sulfuric acid, hydrochloric acid, phosphoric acid, p-toluene sulfonic acid, aluminum salts, magnesium chloride, zirconium sulfate, zirconium lactate, zirconium citrate, zirconium acetate, zinc chloride and mixtures thereof.

18. Resin composition comprising:
   the reaction product of an amine derivative selected from the group consisting of melamine, glycolurile and their mixtures and a compound having the following formula:

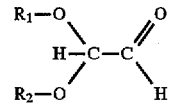

wherein $R_1$ and $R_2$ are $C_1$-$C_8$ alkyl or $R_1$ and $R_2$ are joined to form a cyclic dioxolano or a dioxano substituent; a polyol having 2 or more hydroxyl groups; and a hydrophobic modifier having a non-polar portion which combines with the resin to provide water resistance to the resin, wherein the hydrophobic modifier is a hydroxy, amino or amido-functional compound containing a $C_6$-$C_{20}$ alkyl or aryl group.

19. Resin composition of claim 18 wherein $R_1$ and $R_2$ are $C_1$-$C_4$ alkyl group.

20. Resin composition of claim 19 wherein $R_1$ and $R_2$ are a methyl group.

21. Resin composition of claim 19 wherein $R_1$ and $R_2$ are the same.

22. Resin composition of claim 18 wherein the reaction product is reacted with the polyol.

23. Resin composition of claim 18 comprising 1 to 99% by weight of polyol by weight of the resin composition and 0.1 to 20% by weight of hydrophobic modifier by weight of the resin composition.

24. Resin composition of claim 18 comprising 15 to 50% by weight of polyol by weight of the resin composition and 2 to 10% by weight of hydrophobic modifier by weight of the resins composition.

25. Resin composition of claim 18 wherein the hydrophobic modifier is reacted with the reaction product.

26. Resin composition of claim 25 wherein the hydrophobic modifier is selected from the group consisting of ethoxylated glycerol monostearate, benzoguanamine and tetraethylene tetramine decanamide.

27. Resin composition of claim 25 further comprising an acid catalyst.

28. Resin composition of claim 27 comprising 0.1% to 15% of acid catalyst by weight of the reaction product.

29. Resin composition of claim 28 further comprising a hydroxyl containing polymer, wherein the resin composition used to crosslink said polymer.

30. Process for coating a substrate comprising applying the resin composition according to any of claims 2, 4, 7, 9, 13, 14 and 15 with a hydroxyl containing polymer to a substrate, followed by curing the resin to crosslink the polymer.

31. Process of claim 30 wherein the substrate is selected from the group consisting of wood, metal, polyester, polyethylene, paper, metallized paper, foil and polypropylene.

* * * * *